United States Patent Office 3,767,773
Patented Oct. 23, 1973

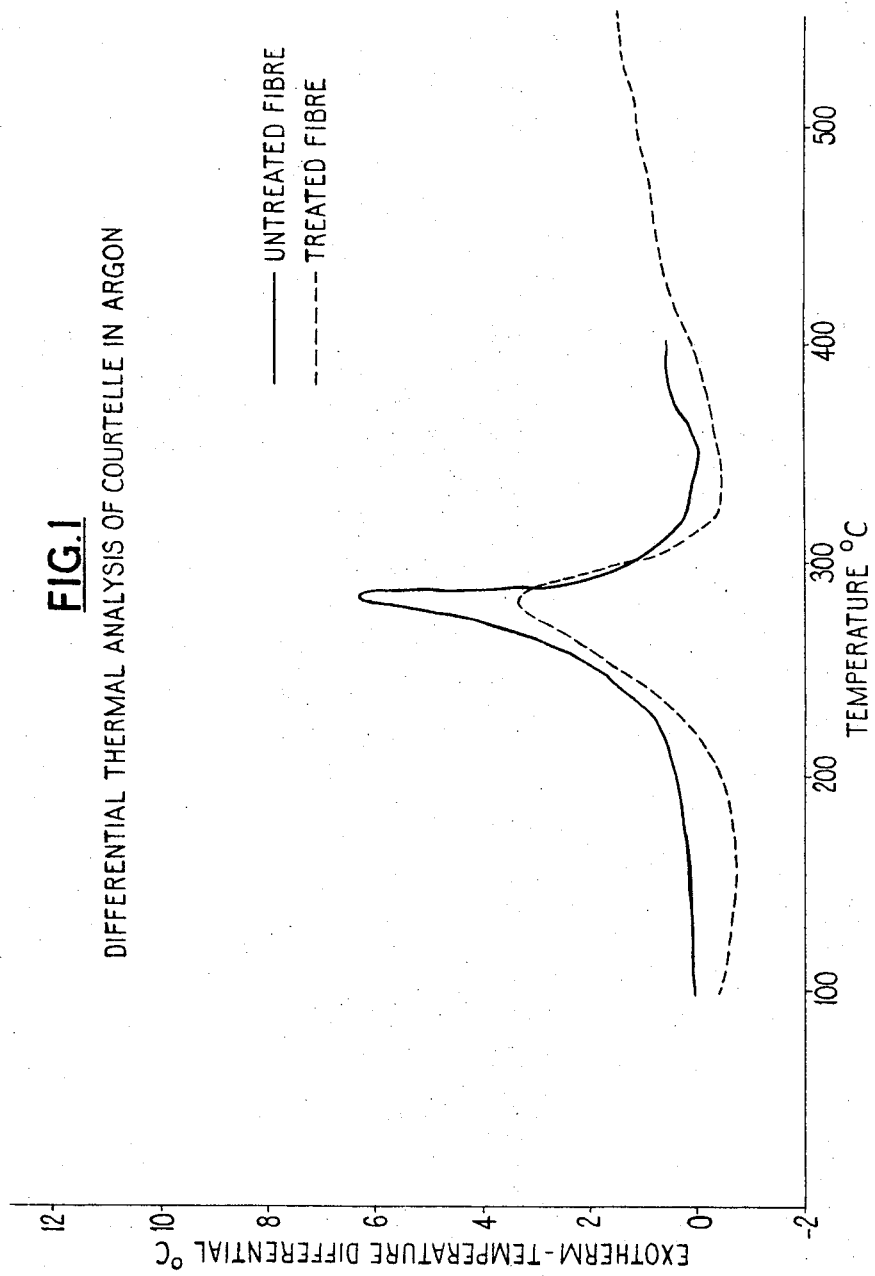

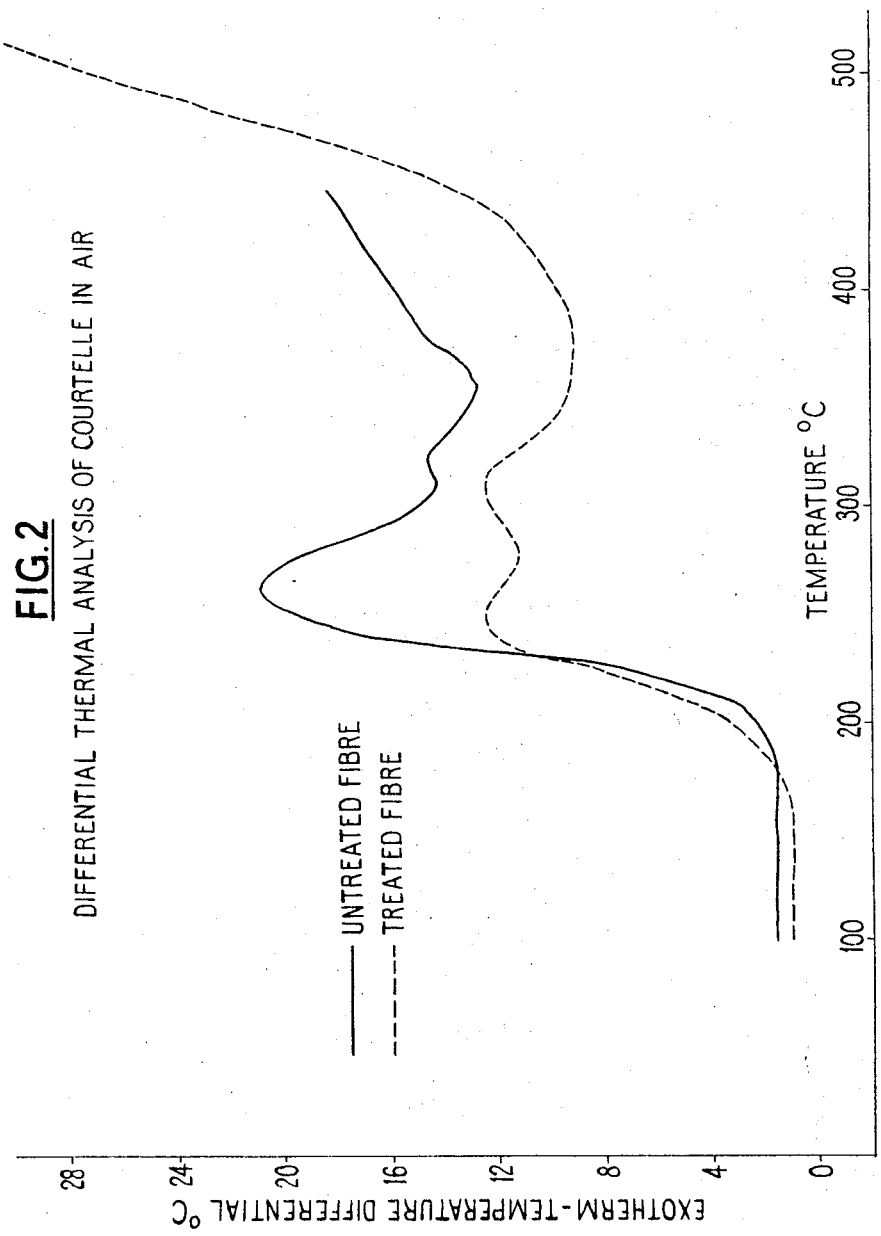

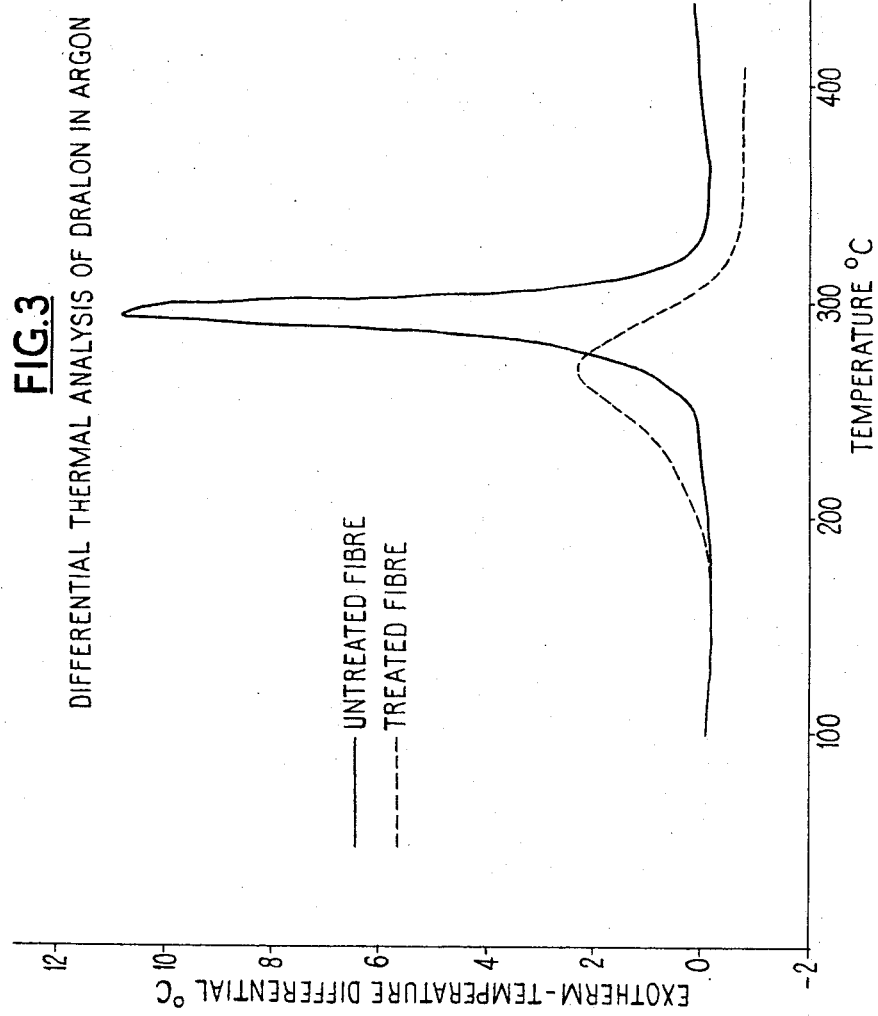

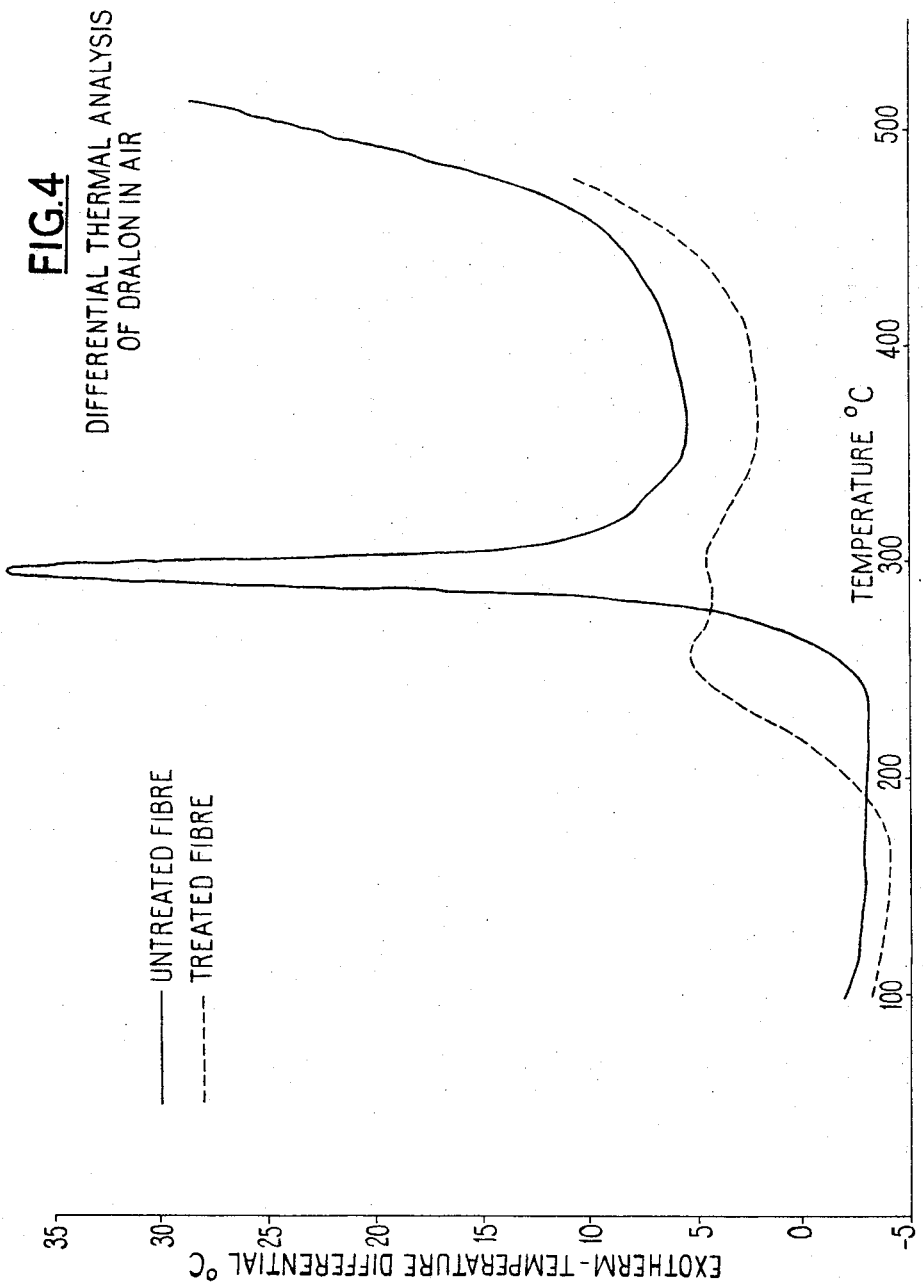

3,767,773
METHOD OF MANUFACTURING CARBON ARTICLES
William Neil Turner, Mickleover, and Frank Charles Johnson, Babbington, near Eastwood, England, assignors to The Secretary of State for Defence, London, England
Filed Oct. 30, 1970, Ser. No. 85,486
Int. Cl. C01b *31/02, 31/67*
U.S. Cl. 423—447    6 Claims

ABSTRACT OF THE DISCLOSURE

A method of manufacturing a carbon article comprises treating an article made of an acrylic material with a solution containing free hydroxylamine and subsequently pyrolysing the treated article. The invention is particularly useful in the production of carbon fibres.

---

The present invention relates to the manufacture of carbon articles from acrylic material and more particularly to a process for the modification of acrylic material to render them more easily processed by conventional carbonising procedures.

The acrylic materials referred to herein comprises polymeric compositions containing more than 80% by weight of polymerised acrylonitrile. This includes materials produced by polymerisation of acrylonitrile, alone or in combination with other monomers copolymerisable with acrylonitrile. These other monomers include acrylic esters and their derivatives such as methyl acrylate, methyl methacrylate, methyl chloroacrylate and vinyl chloroacetate and acids such as acrylic, methacrylic, benzene sulphonic acid and halides such as vinyl chloride, vinylidene chloride and polymerisable hydrocarbons, alcohols, ethers, amides, amines and ketones.

The process of this invention can be applied to acrylic materials in many forms. These forms include, but are not limited to, films, tapes, sheets, rod, tubing and other moulded or extruded articles which are required to be converted to a carbonaceous product. The main importance of this invention, however, is in applying the process to acrylic materials in fibrous form prior to the carbonising process, which converts the acrylic material to a carbonaceous fibre. The fibrous forms can include continuous filament tows, yarns, staples, tapes, mats, knitted or woven fabrics and fibrillated tapes.

Carbonaceous fibres produced by heating an acrylic composition in inert gas atmosphere to a temperature higher than 800° C. have a unique combination of chemical, physical and mechanical properties. These properties make them suitable for use in many technical and industrial applications. For example their high thermal and electrical conductivity, enables such fibres to be used in the manufacture of heating tapes and elements, and their chemical resistance can be used in the production of filtration media. The thermal stability of carbon fibres makes them suitable for the fabrication of flame proof textile materials and thermal insulation. However, most important of all are the good mechanical properties of these fibres. In particular their high tensile strength and modulus makes them most useful as a reinforcement in composite materials. Incorporation of these fibres in plastics, metals and ceramic materials can produce composites which have most advantageous mechanical properties.

It is well known to those skilled in the art that carbon fibres with high physical and mechanical properties have a molecular structure comprising layers of strong bonded carbon atoms. These layers have a high degree of preferred orientation in the direction parallel to the fibres axis. A measure of this orientation can be obtained by X-ray diffraction techniques. To achieve this highly oriented carbon fibre structure from an acrylic composition, it is most convenient to thermally treat a highly oriented acrylic fibre in a manner such that this preferred orientation is maintained at all stages in the carbonising process. This can be most easily done by the suitable application of tension to the fibres, or alternatively by restraining the fibres to a fixed length during the carbonising processes.

Any tendency of fibres to soften or melt, allowing physical relaxation at critical stages in the pyrolysis, can cause a loss of orientation and inevitably results in poor physical properties of the final product. An additional disadvantage is that fibres are caused to adhere together, resulting in poor textile handling properties, and introducing potential stress raising points on the surface. Therefore it is imperative to avoid softening or melting.

The existence of a critical temperature region between 200° C. and 350° C. in which a highly exothermic reaction takes place, is a property of most acrylic compositions. This reaction can cause thermal runaway during pyrolysis, which in turn results in fusion of the fibre sample and loss of orientation. In severe cases the gross morphology of fibre is destroyed completely, resulting in a coke like product.

Therefore it is evident that strict control of the exothermic energy released in the early part of thermal processing is vital to the production of good mechanical properties. For the majority of acrylics, since they have particularly sharp exotherms, satisfactory control could only be achieved by employing prohibitively slow rates of temperature rise in any conventional production process.

A second difficulty with these same materials is that the onset of reaction at the exotherms occurs at temperatures in excess of 200° C. Since very little chemical change takes place before this temperature, it follows that the original polymer structure is subjected to a temperature far in excess of its glass transition temperature of about 100° C. Therefore a high possibility exists, that despite very slow processing, fibres can adhere together as a result of softening, even before the onset of the exotherm.

Thus a means of treating acrylics so as to modify the exotherm by spreading it over a large temperature range, and also decreasing substantially its onset temperature, would enable conventional processing of a wide range of acrylic materials to produce carbon fibres having high mechanical properties.

The present invention provides a treatment which achieves a chemical modification which we believe will apply to any acrylic fibre, which fulfills the criteria outlined above. This therefore enables it to be used as a precursor to high physical property carbon fibres. Accordingly, the objectives of the invention are as follows:

(1) To control the sharp release of energy which occurs when any acrylic composition is pyrolysed through the region 200° C. to 350° C., to an extent which enables high quality carbonaceous material to be manufactured from such as composition.

(2) To suitably modify available acrylic fibres without causing adverse swelling or physical damage to the structure.

(3) To enable acrylics to be more easily thermally processed to carbon fibres.

(4) To enable a wide range of acrylics to be selected as precursors for carbon fibre production.

(5) To enable acrylics to be processed thermally without loss of control.

(6) To enable acrylics to be processed thermally with no loss of fibre morphology.

(7) To reduce the risk of fibres softening in the early stages of pyrolysis.

(8) To improve the potential physical properties available from acrylic fibres.

According to the present invention, a method of manufacturing a carbon article comprises treating an article made of acrylic material with a solution containing free hydroxylamine and subsequently pyrolysing the treated article. The article may be immersed in the solution, which preferably comprises a solution of an acid salt of hydroxylamine buffered to a pH of 7.5–9.0 with a suitable alkaline material.

The article may be subsequently pyrolysed by heating to 1,000° C. in an inert atmosphere at a rate of rise of temperature of between 6 and 12° C. per minute, preferably after a prior oxidative process.

The invention also comprises a carbon article, particularly a carbon fibre, made by the method according to the invention.

The process comprising the invention involves the immersion of an acrylic fibre in a solution containing free hydroxylamine. This may be conveniently obtained from a solution of an acid salt of hydroxylamine buffered to a pH of 7.5–9.0 with a suitable alkaline material such as sodium carbonate, or alkali metal carbonate or hydroxide. Organic bases such as amines or derivatives of amines could also be employed as buffers. Alternatively any solution from which free hydroxylamine can be generated by heating or chemical conversion can be used; thus a solution of hydrazine could be heated to produce free hydroxylamine.

The temperature of any suitable solution can usefully range from ambient to 100° C., and the time of immersion in the solution may be any period within which the necessary chemical modification can be achieved. An upper time limit exists only as a period beyond which adverse swelling or other damage to the fibre would occur.

The most suitable measurement of the efficacy of a treatment with hydroxylamine is made by differential thermal analysis. In this technique the manner in which energy is released or absorbed as a function of environmental temperature can be observed. It has already been stated that acrylic materials show a strong exotherm when heated in inert atmosphere, or in air, through the temperature region 200° C–350° C. In the case of polyacrylonitrile, and also in the cases of certain acrylic copolymer systems, the exotherm occurs over a very narrow range of temperature, and in consequence becomes almost explosive under normal carbonising conditions. It can be demonstrated by the aforesaid technique, that modification of such systems by hydroxylamine causes extensive spreading of the exotherm by causing its initiation at temperature as low as 150° C., and thereby moderating the rate at which energy is released.

Our own apparatus for differential thermal analysis is based on the design of Lodding and Hammel, "Thermoanalytical methods of investigation," Paul D. Garn, Chapter 7, Sec. 10, in which a selected atmosphere is passed through a specimen throughout the analysis. Two identical cells are enclosed symmetrically in an environment capable of being heated according to a linear temperature programme. Each cell has a porous base, through which a selected preheated purge gas is passed at a constant rate throughout the test, ensuring efficient removal of reaction products formed in the sample cell during the heating process. A platinum/platinum plus 13% rhodium thermocouple is placed centrally within each cell.

The fiber sample to be subjected to D.T.A., is chopped finely, and prepared as a 10% weight for weight mixture in pure calcined alumina. 0.45 gm. of this mixture is packed uniformly into one of the two cells, and a similar weight of the alumina is packed into the remaining cell, serving as an inert reference material. During the test, temperature differences arise between the sample and reference cells, which occur as a result of chemicals or physical changes within the sample. This temperature differential is amplified and recorded continuously, providing a sensitive measure of the degree of exothermicity or endothermicity in the fibre sample. The form of the peak produced demonstrates the rate at which a reaction proceeds as a function of temperature.

In order to give a better understanding of the invention and to show how it may be carried into effect, reference is made to the following example. These are not to be construed as limiting its scope in any way.

After treatments according to the method of the invention, all samples underwent the following carbonising schedule.

(a) An initial period during which samples were heated under restraint, in flowing air to temperatures between 220 and 250° C., for times varying from 7 to 16 hours.

(b) A subsequent period in which the partially pyrolysed samples were heated to 1,000° C. in a stream of purified argon at rates varying from 6 to 12° C./minute.

In the following examples various acrylic fibers are used and identified by trade name. A more complete characterization of the composition thereof is as follows:

Courtelle is an acrylic fiber having at least 85% of repeating acrylonitrile units, the repeating units being —$CH_2CH(CN)$— and commercially available from Courtaulds Limited of Coventry, England. Similarly, Duralon Normal is an acrylic-based copolymer composed of at least 85% by weight of acrylonitrile units and available from Farbenfabriken Bayer AG. Duralon T is an acrylic homopolymer composed of 100% by weight acrylonitrile also available from Farbenfabriken Bayer AG.

EXAMPLE 1

A sample of high tenacity Courtelle consisting of a 10,000 filament tow of 1.5 denier per filament, supplied by Courtaulds Limited of Coventry, England, was divided into two batches. One batch was to be regarded as a control, and the other batch was treated by the method of the invention. This second batch was immersed in a boiling aqueous solution containing 0.2% w./w. of hydroxylamine hydrochloride, and 0.15% w./w of anhydrous sodium carbonate, which had a pH value of 7.5. The fibre remained in the solution for 30 minutes, after which time it was washed and dried at 105° C.

Small portions of both batches of fibre were tested by differential thermal analysis, to determine their thermal characteristics. Tests were performed in air and argon. The results are shown in FIGS. 1 and 2, FIG. 1 showing a comparison of the results in argon, and FIG. 2 being a comparison of the results in air. The ordinate axes represent the temperature differential between the sample and inert reference cells, while the abscissae correspond to the environmental temperature.

The remainder of each fibre batch (both control and treated fibre) was thermally processed in an identical manner according to the schedule previously described. Ten to twelve fibres from each carbonised batch were randomly selected for measurement at room temperature, of tensile strength and Young's modulus. The comparative results are presented in Table 1.

EXAMPLE 2

A sample of Dralon Normal consisting of a 170,000 filament tow of 1.5 denier per filament, supplied as 3 denier per filament fibre by Bayer Fibres Limited of Richmond, England, was divided into two batches. One batch was again to be regarded as a control, and the other batch was treated according to the method of the invention. The hydroxylamine treatment used was identical to that quoted in Example 1. Differential thermal analysis was performed on both batches, and the effect of the treatment on the exothermic reaction is presented in FIG. 3, which compares the exotherms observed in argon atmosphere, and FIG. 4 which compares the exotherms observed in air. The remainder of each batch was identically thermally processed according to the schedule described, and fibres from each carbonised sample were physically tested using the same procedure to that described in Example 1. The comparative results are presented in Table 1.

Mechanical properties are also presented in Table 1 for three other similar experiments involving Dralon, and in each case a control sample is compared with another treated with hydroxylamine solution.

EXAMPLE 3

A sample of Dralon T consisting of a 396 filament, 2.1 denier per filament yarn, supplied by Bayer Fibres Limited, of Richmond, England, was selected. This acrylic represents a precursor containing no copolymer and may be regarded as an almost pure polyacrylonitrile fibre. The fibre sample was divided into a control batch and a second batch to which the method of the invention was applied. The hydroxylamine treatment used was identical to that quoted in Example 1.

Each batch was carbonised in an identical fashion according to the programme already described and fibres were mechanically tested using the procedure adopted in Examples 1 and 2. The comparative results are quoted in Table 1.

TABLE 1

| Precursor fibre | | Mean breaking strength, $10^3$ lb. in.$^{-2}$ | | Mean Young's modulus, $10^6$ lb. in.$^{-2}$ |
|---|---|---|---|---|
| Courtelle (Example 1) | C | 246 | C | 25.9 |
|  | H | 363 | H | 29.5 |
| Dralon (Normal) (Example 2) | C | 213 | C | 20.4 |
|  | H | 266 | H | 23.4 |
|  | C | 215 | C | 28.9 |
|  | H | 297 | H | 26.6 |
|  | C | 257 | C | 24.4 |
|  | H | 329 | H | 25.1 |
|  | C | 315 | C | 29.7 |
|  | H | 370 | H | 31.5 |
| Dralon T (Example 3) | C | 233 | C | 31.5 |
|  | H | 282 | H | 34.2 |

KEY.—C=Control sample; H=Hydroxylamine treated fibre.

The results of Table 1 show a consistent and substantial improvement in the strength of the carbon fibres produced after a suitable hydroxylamine treatment, and a smaller but significant improvement in Young's modulus.

In addition, it was noted that with acrylics which display a sharp exotherm in the first processing stage, such as Dralon (Normal) or Dralon T, the fibre handling characteristics were greatly improved by including the said treatment. Fibres which were carbonised with no prior modification tended to stick or fuse together, whereas those carbonised after hydroxylamine treatment completely retained their fibre morphology.

Although the examples above relate to the manufacture of carbon fibres from acrylic fibres, it will be appreciated that the present invention is applicable to a number of carbon articles, particularly to sheets, films and the like. Other articles as mentioned above may be treated, but there may be practical limitations since as the thickness of the article increases, so must the time of treatment be increased, and it may be necessary to carry out the pyrolysis very slowly to avoid damage to the structure.

We claim:

1. A method of manufacturing a carbon article comprising the steps of:
   (a) immersing an article made of a polymeric composition containing more than 80% by weight of polymerized acrylonitrile in a solution containing free hydroxylamine at a temperature of about 20–100° C., the solution having a pH of about 7.5–9.0;
   (b) heating the thus-treated article to a temperature of between 200° C. and 350° C. in a moving air stream and thereafter;
   (c) pyrolysing the treated article by heating to a temperature greater than 800° C. in an inert atmosphere.

2. A method as claimed in claim 1 and in which the solution initially contains a constituent from which hydroxylamine may be generated by heating or chemical conversion.

3. A method as claimed in claim 1 and in which the article is immersed in a boiling solution of hydroxylamine for a time of approximately 30 minutes.

4. A method as claimed in claim 1 and in which the carbon article comprises a carbon fibre.

5. A method as claimed in claim 1 in which heating step (b) is conducted at a temperature of between 220° C. and 250° C. for a period of time between 7 and 16 hours.

6. A method as claimed in claim 1 in which pyrolysis step (c) is conducted at 1000° C. at a rate of rise of temperature of between 6 and 12° C. per minute.

References Cited

UNITED STATES PATENTS

| 3,416,874 | 12/1968 | Robin | 8—52 |
| 3,533,743 | 10/1970 | Prescott et al. | 23—209.1 |
| 3,539,295 | 10/1970 | Ram | 23—209.1 |
| 3,552,923 | 1/1971 | Carpenter et al. | 23—209.1 |

OTHER REFERENCES

Vos Burgh: "Textile Research Journal," vol. 30, 196, pp. 882, 889 and 890.

EDWARD J. MEROS, Primary Examiner

U.S. Cl. X.R.

264—29; 8—115.5; 423—449

UNITED STATES PATENT OFFICE
CERTIFICATE OF CORRECTION

Patent No. 3,767,773          Dated October 23, 1973

Inventor(s) William Neil Turner and Frank Charles Johnson

It is certified that error appears in the above-identified patent and that said Letters Patent are hereby corrected as shown below:

Column 1, in the heading insert the following:

--Claims priority, application Great Britain November 3, 1969  54121/69--

Signed and sealed this 30th day of July 1974.

(SEAL)
Attest:

McCOY M. GIBSON, JR.
Attesting Officer

C. MARSHALL DANN
Commissioner of Patents